(12) United States Patent
Becker et al.

(10) Patent No.: US 10,882,106 B2
(45) Date of Patent: Jan. 5, 2021

(54) METHOD FOR PRODUCING A COMPOSITE MATERIAL

(71) Applicants: ThyssenKrupp Steel Europe AG, Duisburg (DE); ThyssenKrupp AG, Essen (DE)

(72) Inventors: Jens Ulrik Becker, Duisburg (DE); Rüdiger Mempel, Dortmund (DE); Stefan Myslowicki, Mönchengladbach (DE); Roland Wunderlich, Bergkamen (DE); Ralf Zemke, Hünxe (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 127 days.

(21) Appl. No.: 15/527,366

(22) PCT Filed: Nov. 3, 2015

(86) PCT No.: PCT/EP2015/075522
§ 371 (c)(1),
(2) Date: May 17, 2017

(87) PCT Pub. No.: WO2016/078903
PCT Pub. Date: May 26, 2016

(65) Prior Publication Data
US 2017/0326632 A1 Nov. 16, 2017

(30) Foreign Application Priority Data

Nov. 19, 2014 (DE) .......................... 10 2014 116 949

(51) Int. Cl.
*B22D 19/04* (2006.01)
*B23K 20/04* (2006.01)
(Continued)

(52) U.S. Cl.
CPC .............. *B22D 19/04* (2013.01); *B23K 20/04* (2013.01); *B32B 15/011* (2013.01);
(Continued)

(58) Field of Classification Search
CPC ........ B22D 19/00; B22D 19/04; B22D 19/14; B22D 19/16
See application file for complete search history.

(56) References Cited

U.S. PATENT DOCUMENTS

| 1,757,790 A | 5/1930 | Armstrong |
| 3,695,337 A | 10/1972 | Grand |

(Continued)

FOREIGN PATENT DOCUMENTS

| DE | 2049757 A | 4/1971 |
| DE | 10011758 A | 9/2001 |

(Continued)

OTHER PUBLICATIONS

Matweb ("http://www.matweb.com/search/datasheet_print.aspx?matguid=cb78d1f75fdc45b2bfa8c5efd38b5440") (Year: 2001).*

(Continued)

*Primary Examiner* — Kevin P Kerns
*Assistant Examiner* — Steven S Ha
(74) *Attorney, Agent, or Firm* — Avant Law Group, LLC

(57) ABSTRACT

Disclosed is a method for producing a composite material, wherein two or more composite components are arranged with respect to one another by casting to form a composite, so as to create a contact region essentially without a material bond between the composite components, wherein the composite components are thereafter materially bonded to one another in the contact region by means of a hot-rolling process.

19 Claims, 2 Drawing Sheets

(51) Int. Cl.
*B32B 15/01* (2006.01)
*B23K 103/04* (2006.01)
*B23K 103/20* (2006.01)
*B23K 103/24* (2006.01)

(52) U.S. Cl.
CPC ...... *B23K 2103/04* (2018.08); *B23K 2103/20* (2018.08); *B23K 2103/24* (2018.08)

(56) References Cited

U.S. PATENT DOCUMENTS

| | | | |
|---|---|---|---|
| 7,250,221 B2 * | 7/2007 | Ballyns | B22D 19/08 164/111 |
| 2003/0029530 A1 | 2/2003 | Junius | |
| 2006/0177683 A1 | 8/2006 | Ballyns | |
| 2012/0177935 A1 * | 7/2012 | Richards | C21C 7/06 428/457 |

FOREIGN PATENT DOCUMENTS

| | | | | |
|---|---|---|---|---|
| DE | 10202212 A | | 8/2003 | |
| DE | 102005006606 B3 | | 3/2006 | |
| DE | 102008015845 B | | 11/2009 | |
| EP | 946315 A1 | | 10/1999 | |
| GB | 888404 A | * | 1/1962 | ............... B22D 7/02 |
| GB | 2033794 A | | 5/1980 | |
| JP | S53072733 A | | 6/1978 | |
| JP | S58032543 A | | 2/1983 | |
| JP | S611447 A | | 1/1986 | |
| JP | S61126944 A | | 6/1986 | |
| JP | S61286005 A | | 12/1986 | |
| JP | S62214887 A | | 9/1987 | |
| WO | 9823571 A | | 6/1998 | |
| WO | 01/68293 A1 | | 9/2001 | |

OTHER PUBLICATIONS

English translation of International Search Report issued in PCT/EP2015/075522 dated Jan. 11, 2016 (dated Jan. 21, 2016).
English abstract for DE102008015845B.
English abstract for DE102005006606.
Japanese Application No. 2017-526697, Office Action dated Oct. 28, 2019, 6 pages.

* cited by examiner

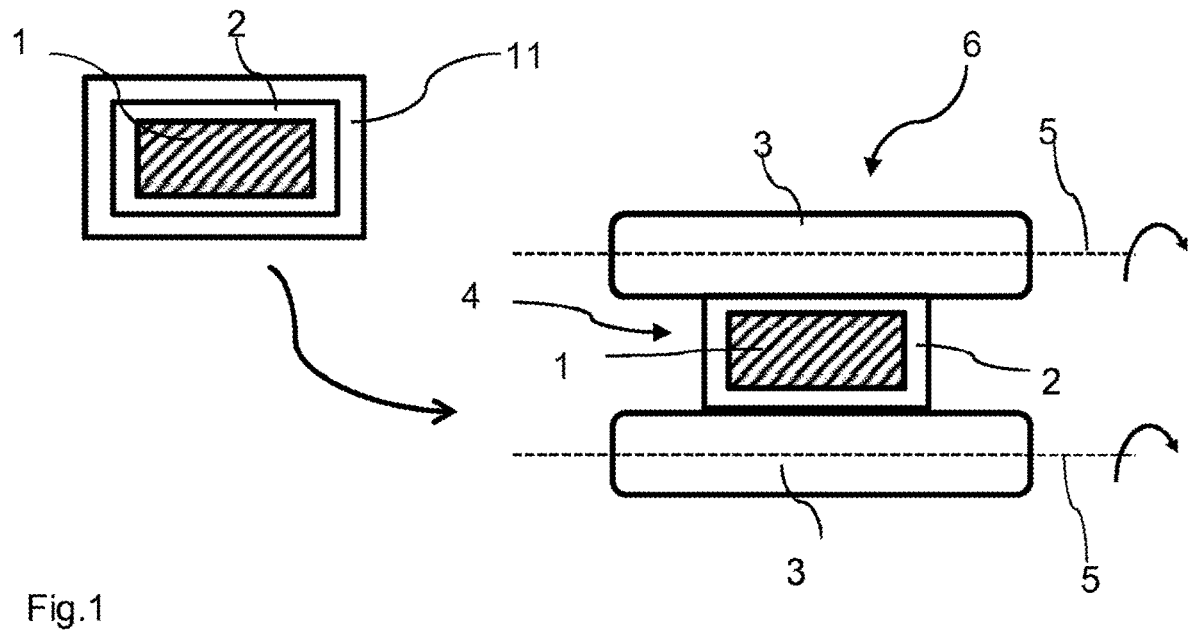
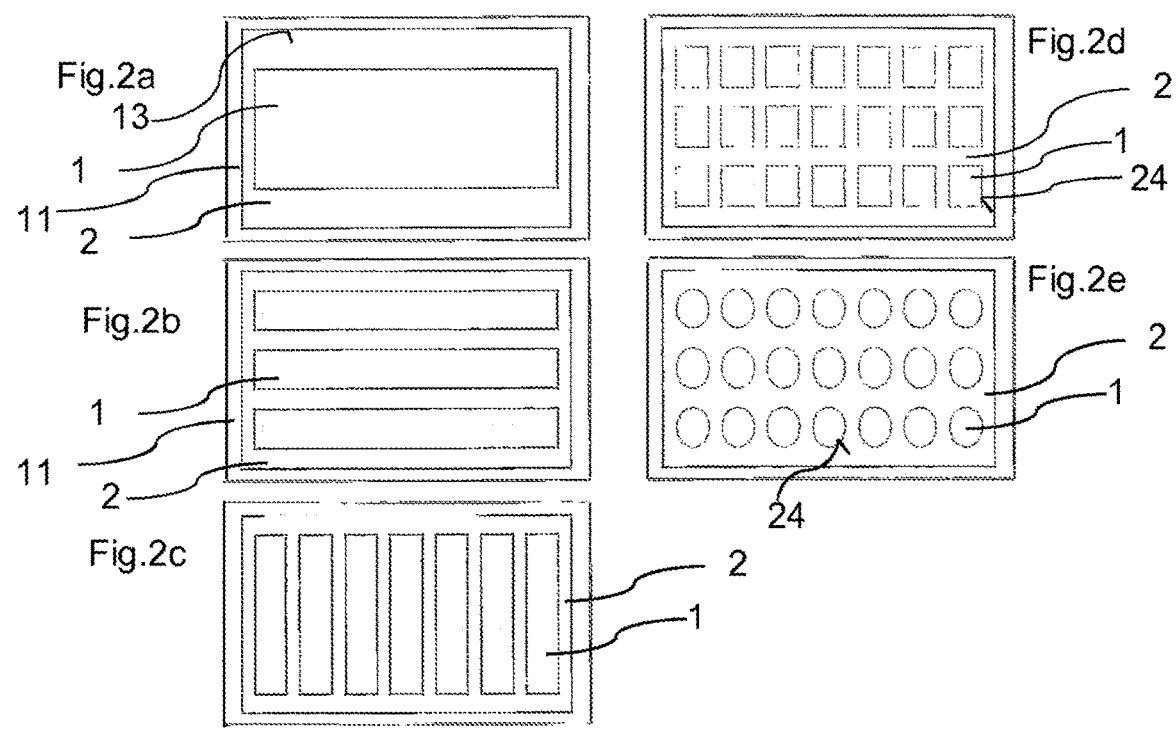
Fig.1
Fig.2a
Fig.2b
Fig.2c
Fig.2d
Fig.2e

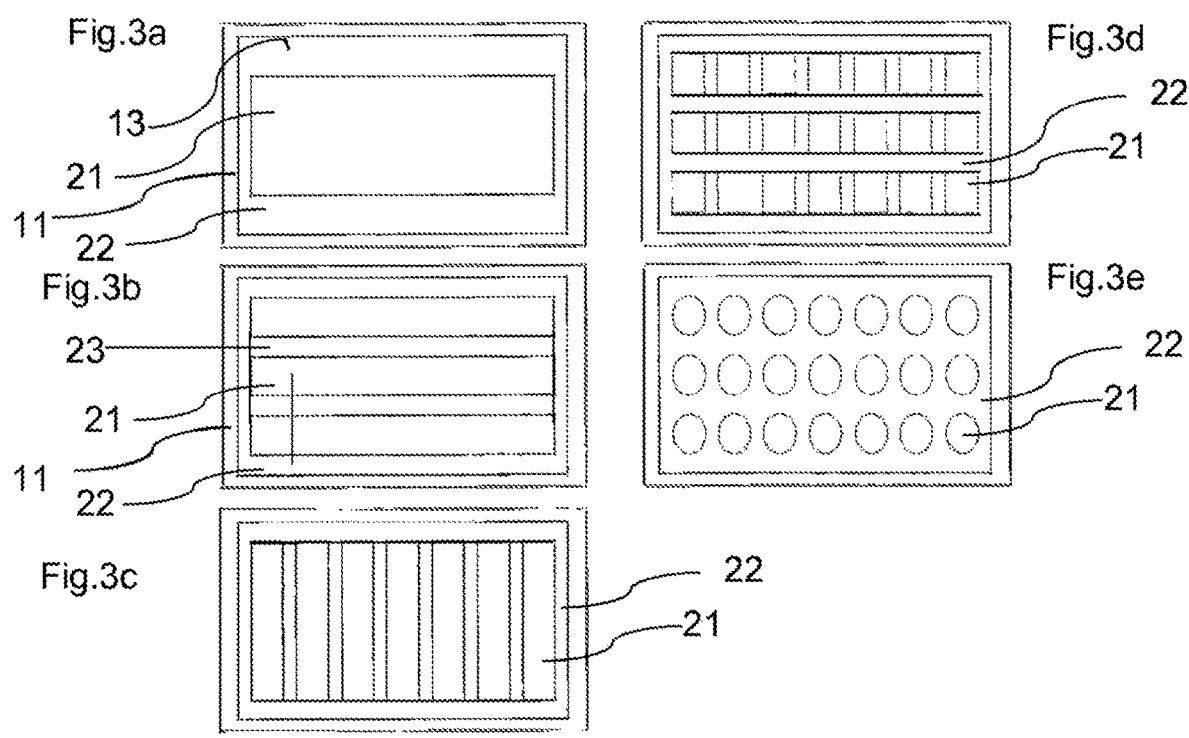

METHOD FOR PRODUCING A COMPOSITE MATERIAL

CROSS REFERENCE TO RELATED APPLICATIONS

This application is a U.S. National Stage Entry of International Patent Application Serial Number PCT/EP2015/075522, filed Nov. 3, 2015, which claims priority to German Patent Application No. DE 10 2014 116 949.2 filed Nov. 19, 2014, the entire contents of both of which are incorporated herein by reference.

FIELD

The present disclosure generally relates to a method for producing a composite material.

BACKGROUND

In such composite materials, composite components such as steel materials of different composition are joined to form a composite material. The purpose of this is to be able to provide a composite material which brings together desired properties of the individual composite components in a composite material.

For creating such a composite material, a continuous casting process in which the composite components are cast one inside the other is known in the prior art, for example from document EP 946 315 A1. In so doing, when combining certain steel qualities, it is possible for the steels to partially or completely melt, and for the steel qualities to become mixed. Then, the composite produced by the casting is rolled or plated. Document GB 2 033 794 A discloses a method by means of which composite sheets or composite plates are produced by dipping the plate stacks in a melt. Also, document WO 01/68293 A1 discloses a method in which, in a casting process, core and edge layers for forming the composite material are materially bonded to one another by superficial melting.

Another method for arranging the composite components to form the composite is known from document DE 10 2005 006 606 B3, in which the individual composite components in the form of plates are bonded to one another by an encircling weld. This has been found to have the drawback that, owing to different thermal expansions in the case of certain combinations of steel qualities, this weld can reopen when the welded plate stack is reheated for a hot-rolling process, and the composite partners can separate from one another.

BRIEF DESCRIPTION OF THE FIGURES

FIG. 1 is a schematic view showing an embodiment of a method for producing a composite material, as disclosed herein.

FIG. 2a is a schematic view of an embodiment of a casting mold for use in an embodiment of a method of the present disclosure.

FIG. 2b is a schematic view of an alternate embodiment of a casting mold for use in a method of the present disclosure.

FIG. 2c is a schematic view of an alternate embodiment of a casting mold for use in an embodiment of a method of the present disclosure.

FIG. 2d is a schematic view of an alternate embodiment of a casting mold for use in an embodiment of a method of the present disclosure.

FIG. 2e is a schematic view of an alternate embodiment of a casting mold for use in an embodiment of a method of the present disclosure.

FIG. 3a is a schematic view of an embodiment of a casting mold for use in an alternate embodiment of a method of the present disclosure.

FIG. 3b is a schematic view of an alternate embodiment of a casting mold for use in an alternate embodiment of a method of the present disclosure.

FIG. 3c is a schematic view of an alternate embodiment of a casting mold for use in an alternate embodiment of a method of the present disclosure.

FIG. 3d is a schematic view of an alternate embodiment of a casting mold for use in an alternate embodiment of a method of the present disclosure.

FIG. 3e is a schematic view of an alternate embodiment of a casting mold for use in an alternate embodiment of a method of the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention has the object of providing a method by means of which composite materials can be produced as problem-free and defect-free as possible.

The object of the present invention is achieved with a method for producing a composite material, wherein a first method step involves providing a solid first composite component, wherein in a second method step a second composite component is added by casting to form a composite so as to create a contact region essentially without a material bond between the first composite component and the second composite component, wherein in a third method step for producing the composite material the first composite component and the second composite component are materially bonded to one another in the contact region by means of a hot-rolling process.

In contrast to the prior art, the material components for forming the composite are held together after the casting process without a material bond. The material bond is created only at the hot-rolling stage. In that regard, the method according to the invention proves to be advantageous in that the changes in the volume of the composite components, which take place during the casting process, and preferably contraction thereof, can be used to essentially avoid air inclusions between the first composite component and the second composite component. The casting process then advantageously creates a composite that will survive transport, heating for the third method step and broaching during the rolling procedure without the composite components separating from one another. Furthermore, the method advantageously ensures that an essentially material bond-free composite allows the composite components to be materially bonded to one another in the third method step. It is in particular provided that the liquid second composite component, added by casting, solidifies temporally after the second method step.

Preferably, in the first method step multiple solid composite components, preferably multiple different solid first composite components, are provided and/or in the second method step multiple second composite components, preferably multiple different liquid second composite components, are added by casting. When the second composite component solidifies, the second composite component has a greater volume change, preferably contraction, than the first composite component. Thus, the second composite component and the first composite component are pressed or clamped together, thus establishing the desired composite initially without a material bond. In particular, it is ensured, in the casting process or temporally after the second method step, that the bond in the third method step is established without air inclusions between the first and second composite components. This essentially avoids, in a targeted manner by means of the type of casting process, the second composite component melting onto the first composite component. In particular, the casting process forms such a composite, consisting of the composite components, which can easily be supplied from the casting device to a rolling device for the third method step. In addition, the composite having no material bond up to the point of the third method step makes it possible to avoid the mutually attached composite components coming loose on heating, which might be possible if one were to use the weld seams known from the prior art to form the composite.

Another embodiment of the present invention provides that in the second method step the second composite component is cast into a construction space or interspace bounded by the first composite component.

Another embodiment of the present invention provides that in the first method step the first composite component is provided as a block and, in the second method step, a second composite component is added by casting such that the first composite component is preferably entirely encapsulated by the second composite component.

Thus, the composite components in the composite are advantageously secured in position with respect to one another.

Another embodiment of the present invention provides that the first composite component consists of a core, a rod and/or one or more plates, in particular of different qualities, and the second composite component is made from a melt or multiple melts, in particular of different qualities. In particular, the use of plates or rods advantageously makes it possible to create a multi-layer or fiber-like composite material. For example, the plates form a boundary for the composite and, in the later composite material, form the surface whose surface properties are at least partially codetermined by the material properties of the plates. In that regard, it is conceivable for different plates or rods as first composite component to be introduced into the casting device and so to create a composite material whose surfaces or cores have different physico-chemical properties.

Another embodiment of the present invention provides that the second method step involves creating a temperature difference between the first and the second composite component of greater than 500° C. This makes it possible for a targeted "non-bonding" of the composite components to be, or for an essentially complete melting of the first composite component onto the second composite component to be advantageously avoided, and makes it possible to ensure that essentially no material bond between the composite components is created.

Another embodiment of the present invention provides that the composite produced has a volumetric proportion of an inner composite component of greater than 30% of the total volume. In that context, the inner composite component can be the first composite component which is encapsulated by the second composite component, or the second composite component which is encapsulated by the first composite component. In particular, the inner composite component forms a core. In that context, it is also conceivable for an inner composite component to be of multi-part configuration, and the respective volume fraction is determined by the sum of all the individual parts of the inner composite component. By virtue of the high volume fraction of the inner composite component, the inner composite component can ideally be used for removing heat, and thus for cooling in the casting process.

Another embodiment of the present invention provides that the casting process is carried out in a permanent mold. The use of the permanent mold makes it possible to use, in a simple and uncomplicated manner, an existing device established for casting processes for the method for producing the composite material.

Another embodiment of the present invention provides that in the third method step the composite is deformed in order to compress potential voids.

Another embodiment of the present invention provides that the first and/or the second composite component are configured in the casting process so as to establish a form-fitting engagement between the first composite component and the second composite component in the composite. It is in particular provided that a slab section having oscillation marks is provided as the first composite component. After the casting process, the shape of the first composite component and of the solidified second composite component promotes adhesion of the composite components in the composite. In that context, it is conceivable that the solidified second composite component engages with or catches on the first composite component.

Another embodiment of the present invention provides that two different materials, in particular different qualities of steel, are used as the composite components. For example, a high-carbon first composite component is introduced into the permanent mold as a rod or an otherwise shaped solid body, and then a low-carbon second composite component is cast around the rod or otherwise shaped solid body. It is thus possible to create a composite material which advantageously brings together the properties of the low-carbon and high-carbon composite components.

Another embodiment of the present invention provides that the composite components consist of metals, preferably combinations of carbon steels, rust-, acid- and heat-resistant steels, FeMn steels, FeAlCr steels, Ni—, Ti—, Al— and/or Mg alloys.

Another embodiment of the present invention provides that in the second method step the first composite component is provided as a casting mold and/or a shell and/or consists of multiple first composite components, one or more casting molds and/or one or more shells. In particular, the shape and size of the first composite component can be adapted to a desired shape of the composite material. In that context, it is provided that the composite components are secured in the permanent mold. In particular, the first composite components formed as casting molds or shells are adapted to the shape and size of the permanent mold.

Another embodiment of the present invention provides that the composite components are provided by means of the casting in the second method step in a desired volume ratio and/or aspect ratio. It is in particular provided that the aspect ratio is retained after hot-rolling, even if the composite is clad by the hot-rolling, and is accordingly compressed along a direction of extent. Retention of the aspect ratios makes it possible, even at the stage of forming the composite, to determine the ratio between the composite components in the composite material. The configuration of the composite material can thus be advantageously controlled.

Another embodiment of the present invention provides that any geometric structure of the first composite component and/or of the second composite component is achieved. In particular, the structure can be adapted so as to correspond to the desired requirements for the subsequently produced composite material. In that context, it is conceivable for the structure to be selected such that it is adapted to a possible loading of the subsequently produced composite material. The casting process means that one is less restricted in terms of design freedom than is the case for the methods according to the prior art, in which the composite components are simply joined to form the composite.

Another embodiment of the present invention provides that for the third method step the composite is heated to a rolling temperature and that the composite is rolled on a hot-rolling device.

The present invention also relates to a device for producing a composite material, wherein the device has a permanent mold and a rolling device, wherein the device is configured such that it can be used to carry out a method according to the invention.

In contrast to the prior art, such a device makes it possible to create a composite which withstands transport to a pre-heating device and heating for the third method step, without the composite components separating from one another.

Further details, features and advantages of the invention can be gathered from the drawings and from the following description of preferred embodiments with reference to the drawings. In this case, the drawings illustrate merely exemplary embodiments of the invention which do not limit the concept of the invention.

FIG. 1 shows, schematically, a method for producing a composite material according to a first exemplary embodiment of the present invention. In particular, the method is intended for the creation of a composite material consisting of at least two composite components, wherein two different materials are used as the composite components. The use of different composite components is aimed at creating a composite material which, as much as possible, brings together the respective properties of the individual, different composite components in the composite material. Therefor, a slab-shaped or block-shaped composite 4 made of the desired composite components is preferably provided prior to cladding in a rolling process, preferably with a desired layer thickness distribution. Then, the composite 4 is preferably rolled using rollers 3 to form the composite material in the form of a hot strip. The prior art contains methods in which the composite components are stacked one atop the other to form the composite 4, and are then peripherally welded. In order to create a full-area material bond between the composite components in the composite 4, it is necessary in this context that the surfaces of the composite components be clean and scale-free at the point of the first broaching in a rolling device 6 or roll stand provided for the rolling. The peripheral welding is intended to satisfy these requirements. If the composite components are components which, for example with regard to their temperature behavior and in particular with regard to their thermal expansion behavior, are fundamentally different upon reheating to a hot-rolling temperature, it is impossible to reliably prevent subsequent scale formation between the composite components as a consequence of failure of the weld seam. There is therefore a need to provide a method with which it is possible to provide a composite 4 which can easily be rolled into a composite material.

For producing the composite material, it is provided that, in a second method step, the composite components are arranged with respect to one another by means of a casting process, preferably in a permanent mold 11, so as to essentially avoid the formation of a material bond in a contact region. In particular, the casting process avoids the peripheral welding of the composite components. In that context, it is preferably provided that a second composite component 2 is cast around a first composite component 1 in the permanent mold 11. Contraction of the second composite component 2, which takes place in the context of the casting process, results in the second composite component 2 then being preferably mechanically joined with the first composite component 1 in a form-fitting manner such that the first composite component 1 is enclosed by the second composite component 2, and air inclusions between the first and second composite components 1 and 2 are minimized. Also, the casting process results in an essentially mechanical composite 4 which comprises the composite components and withstands transport, heating to the rolling temperature in the reheating furnace and broaching in a roughing train of the hot-rolling device 6 or of the hot-rolling mill without undesired separation of the composite components, or one composite component separating from the other. In a third method step subsequent to the second method step, the material bond to form the composite material is then created by the hot-rolling process.

When forming the composite 4, it is in particular provided that, during the casting process, melting of the second composite component 2 onto the first composite component 1 is at least partially avoided. Such a material bond-free connection is preferably brought about by superheating just one of the two connection components. It is in particular provided that, in the second method step, there is a temperature difference of greater than 500° C. between the respective composite components. It is also provided that any voids between the composite components are compacted in the context of deformation following the casting process. It is also provided that the first composite component 1 and/or the second composite component 2 are deformed in the second method step such that they engage in a form-fitting manner. For example, use is made, as the first composite component 1, of slab sections having oscillation marks which engage in a form-fitting manner with the solidified second composite component 2 such that this form fit promotes adhesion between the composite components, in particular during transport of the composite 4. It is also provided that, for example, the volume fraction of a first composite component 1 arranged inside the composite 4 makes up at least 30% of the total volume of the composite. Use is preferably made of combinations of carbon steels, rust-, acid- and heat-resistant steels, FeMn steels, FeAlCr steels, Ni—, Ti—, Al— or Mg alloys. Examples of possible combinations are shown in the following table:

| First or second composite component | Second or first composite component |
|---|---|
| carbon steel | rust-, acid- and heat-resistant steel |
| carbon steel | Ni alloy |
| rust-, acid- and heat-resistant steel | Ni alloy |
| rust-, acid- and heat-resistant steel | FeAlCr steel |
| rust-, acid- and heat-resistant steel | Ti alloy |
| rust-, acid- and heat-resistant steel | Al alloy |
| carbon steel | FeMn steel |
| carbon steel | FeAlCr steel |
| rust-, acid- and heat-resistant steel | Mg alloy |
| FeAlCr steel | Ni alloy |

FIGS. 2a-2e show, schematically, casting molds for a method for producing a composite material according to a second exemplary embodiment of the present invention. In that context, the permanent mold 11 and the first composite component preferably essentially form the casting mold for the second composite component. It is in particular provided that the first composite component 1 forms a core around which is cast, in the casting process of the second method step, a melt 21 forming the second composite component 2, as shown in FIG. 2a. In the casting process, the melt 21 preferably takes up the space provided as construction space or interspace between the permanent mold 11, in particular by the boundary of the permanent mold 13, and the core 1. It is in particular conceivable for the first composite component 1 to have many parts, as illustrated in FIGS. 2b to 2e. For example, multiple first composite components 1 are oriented such that they run essentially parallel to an edge or boundary of the permanent mold 13, wherein the edge of the permanent mold defines the construction space available for the casting process. It is also conceivable for multiple first composite components 1 to be arranged with respect to one another in the manner of a chessboard (see FIGS. 2d and 2e). It is further conceivable for the first composite component to have any structure 24 in cross section. For example, the structure is at least partially angular (2a to 2d) or circular or elliptical (see FIG. 2e).

FIGS. 3a-3e show, schematically, casting molds for a method for producing a composite material according to a second exemplary embodiment of the present invention. For this embodiment, it is provided that the casting mold is formed by the second composite component 2 which, in the casting process, is filled with the first composite component 1. It is in particular provided that the second composite component 2 forms a shell 22 which is for example made of plates 23. The method is then preferably used to produce a multi-layer, preferably three-layer composite material, with the central part of the composite material consisting of the first composite component 1 which is in turn encapsulated by the second composite component 2. It is further conceivable for the second composite component 2, which is essentially formed as a casting mold, to have recesses into which the first composite component 1 is poured in the casting process. In particular, the recesses are arranged such that they run at least partially parallel and/or perpendicular to the edge of the second composite component 2. In that context, it is also conceivable that the recesses spread in the manner of a chessboard along a cross section through the second composite component 2. In particular, a structure bounding the recess may be in any desired configuration. For example, the structure 24 of one or more recesses is rectangular, circular or elliptical. It is further conceivable for recesses of different structures 24 and/or different sizes to be arranged in regular and/or irregular fashion along the cross section.

LIST OF REFERENCE SIGNS 1 first composite component
2 second composite component
3 roller
4 composite
5 roller axis
6 hot-rolling device
11 permanent mold
13 boundary of the permanent mold
21 melt
22 shell
23 plate
24 contour profile

What is claimed is:

1. A method for producing a composite material, the method comprising:
    providing a solid first composite component, wherein the first composite component is made from one of:
        a carbon steel;
        a rust-, acid-, and heat-resistant steel;
        an FeAlCr steel;
        an FeMn steel;
        a Ni-alloy; and
        a Ti-alloy;
    casting a second composite component in contact with the first composite component to create a third composite component, wherein for the third composite component, a contact region is formed between the first composite component and the second composite component in which there is no material bond between the first composite component and the second composite component in the contact region, wherein:
        said casting step comprises creating a temperature difference of at least 500° C. between the first composite component and the second composite component in air,
        the temperature difference causing the second composite component to contract against the first composite component to minimize air inclusions; and
    materially bonding the first composite component to the second composite component in the contact region by hot-rolling the third composite component.

2. The method of claim 1, wherein said casting step comprises one of casting the second composite component around the first composite component or casting the second composite component into a construction space bounded by the first component.

3. The method of claim 2, wherein the first composite component includes one or more of a core, a rod, and a plate, and wherein the second composite component made from a melt.

4. The method of claim 1, wherein the created third composite component has a volumetric proportion of an inner composite component of at least 30% of the total volume.

5. The method of claim 1, wherein the casting step is performed in a permanent mold.

6. The method of claim 1, wherein said materially bonding step comprises deforming the created third composite component in order to compress voids.

7. The method of claim 1, wherein during said casting step, the third composite component that is created has a form-fitting engagement between the first composite component and the second composite component.

8. The method of claim 1, wherein the second component is made from one or more of a carbon steel, a rust-, acid- and heat-resistant steel, an FeAlCr steel, a Ni-, Ti-, Al- or Mg alloy and an FeMn steel.

9. The method of claim 1, wherein said first composite component is formed as one of a casting mold or shell.

10. The method of claim 1, further comprising, prior to said materially bonding step, heating the third composite component to a hot-rolling temperature.

11. A method for producing a composite material, the method comprising:
    providing a solid first composite component;
    casting a second composite component around the first composite component,
        wherein a contraction of the second composite component takes place during the casting causing the second composite component to mechanically join with the first composite component in a form-fitting manner such that the first composite component is enclosed by the second component and air inclusions are minimized, a contact region is formed between the first composite component and the second composite component, the contact region being devoid of a material bond between the first composite component and the second composite component, and
        the casting step comprises creating a temperature difference of at least 500° C. between the first composite component and the second composite component in air; and
    subsequently materially bonding the first composite component to the second composite component in the contact region by hot-rolling to form a third composite component.

12. The method of claim 11, wherein the first composite component includes one or more of a core, a rod, and a plate, and wherein the second composite component made from a melt.

13. The method of claim 11, wherein the first composite component makes up at least 30% of the total volume of the third composite component.

14. The method of claim 11, wherein the casting step is performed in a permanent mold.

15. The method of claim 11, wherein the materially bonding step comprises deforming the third composite component to compress voids between the first composite component and the second composite component.

16. The method of claim 11, wherein one of the first composite component or the second composite component is made from one or more of a carbon steel, a rust-, acid- and heat-resistant steel, an FeAlCr steel, a Ni-, Ti-, Al- or Mg alloy and an FeMn steel.

17. The method of claim 16, wherein both of the first composite component and the second composite component are made from one or more of a carbon steel, a rust-, acid- and heat-resistant steel, an FeAlCr steel, a Ni-, Ti-, Al- or Mg alloy and an FeMn steel.

18. The method of claim 11, wherein said first composite component is formed as one of a casting mold or shell.

19. A method for producing a composite material, the method comprising:
    providing a solid first composite component, wherein the first composite component is made from one of a carbon steel, a rust-, acid- and heat-resistant steel, an FeAlCr steel, an FEMn steel, a Ni- or Ti-alloy;
    casting a second composite component in contact with the first composite component to form a third composite component, wherein:
        the casting step includes creating a temperature difference of at least 500° C. between the first composite component and the second composite component in air; and
        a contact region is formed between the first composite component and the second composite component in which there is no material bond between the first composite component and the second composite component in the contact region;
    during the casting of the second composite component, contracting of the second composite component to mechanically join the second composite component with the first composite component in a form-fitting manner to minimize air inclusions; and
    subsequently materially bonding the first composite component to the second composite component in the contact region by hot-rolling the third composite component.

* * * * *